US 9,194,508 B2

(12) United States Patent
Andersen et al.

(10) Patent No.: US 9,194,508 B2
(45) Date of Patent: Nov. 24, 2015

(54) MODULAR VALVE ASSEMBLY (75) Inventors: Michael Andersen, Krefeld (DE);
Herbert Ridder, Rheinberg (DE);
Walter Clemens, Bergisch Gladbach (DE)

(73) Assignee: Norgren GmbH, Alpen (DE)

( * ) Notice: Subject to any disclaimer, the term of this patent is extended or adjusted under 35 U.S.C. 154(b) by 693 days.

(21) Appl. No.: 13/125,621

(22) PCT Filed: Nov. 5, 2008

(86) PCT No.: PCT/EP2008/009308
§ 371 (c)(1),
(2), (4) Date: Apr. 22, 2011

(87) PCT Pub. No.: WO2010/051821
PCT Pub. Date: May 14, 2010

(65) Prior Publication Data
US 2011/0214765 A1    Sep. 8, 2011

(51) Int. Cl.
*F16K 27/00* (2006.01)

(52) U.S. Cl.
CPC ......... *F16K 27/003* (2013.01); *Y10T 137/5283* (2015.04); *Y10T 137/87249* (2015.04); *Y10T 137/87885* (2015.04)

(58) Field of Classification Search
CPC . F16K 27/029; F16K 27/0281; F16K 27/003; F16K 27/12; F15B 13/081; F15B 13/082; F15B 13/0896; F15B 13/0835; F02M 69/465; Y10T 137/5109; Y10T 137/5196; Y10T 137/5283; Y10T 137/87885

USPC .......................................................... 251/367
See application file for complete search history.

(56) References Cited

U.S. PATENT DOCUMENTS

| | | | | |
|---|---|---|---|---|
| 3,860,033 A | * | 1/1975 | Grove et al. | 137/625.5 |
| 3,993,091 A | * | 11/1976 | Loveless | 137/269 |
| 4,303,097 A | * | 12/1981 | Zerby | 137/599.07 |
| 4,844,036 A | * | 7/1989 | Bassler et al. | 123/470 |
| 5,127,440 A | * | 7/1992 | Maas et al. | 137/884 |
| 5,577,480 A | * | 11/1996 | Gmelin et al. | 123/470 |
| 5,718,206 A | * | 2/1998 | Sawada et al. | 123/470 |
| 5,992,461 A | * | 11/1999 | Gilmore et al. | 137/625.65 |
| 6,502,601 B2 | | 1/2003 | Eidsmore | |
| 6,523,570 B2 | * | 2/2003 | Weiss et al. | 137/627.5 |
| 6,644,265 B2 | * | 11/2003 | Parker et al. | 123/198 F |
| 6,805,414 B2 | * | 10/2004 | Herbst et al. | 303/119.3 |
| 6,817,325 B2 | * | 11/2004 | Dinkel et al. | 123/90.13 |
| 6,820,634 B2 | * | 11/2004 | Reichert et al. | 137/271 |
| 6,874,537 B2 | * | 4/2005 | Hayashi et al. | 137/884 |
| 6,904,895 B1 | * | 6/2005 | Moreno | 123/470 |

(Continued)

FOREIGN PATENT DOCUMENTS

DE   102004041256 A1   3/2006
WO   2005008107 A2    1/2005

*Primary Examiner* — John Fox
(74) *Attorney, Agent, or Firm* — The Ollils Law Group LLC (57) ABSTRACT A modular valve assembly (500) is provided. The modular valve assembly (500) comprises a first valve assembly plate (401) and a second valve assembly plate (402). One or more modular valves (200, 300) are positioned between the first valve assembly plate (401) and the second valve assembly plate (402). The first valve assembly plate (401) and the second valve assembly plate (402) are adapted to align the one or more modular valves (200, 300) in more than one configuration.

14 Claims, 6 Drawing Sheets

(56) References Cited

U.S. PATENT DOCUMENTS

| | | |
|---|---|---|
| 7,032,564 B1 * | 4/2006 | Kryglowski et al. ...... 123/198 F |
| 7,537,026 B2 * | 5/2009 | Dantlgraber et al. .... 137/625.34 |
| RE41,299 E * | 5/2010 | Atkin et al. .............. 137/315.01 |
| 8,413,679 B2 * | 4/2013 | Wenske et al. ................ 137/560 |
| 2006/0201563 A1 | 9/2006 | Giese et al. |

\* cited by examiner

MODULAR VALVE ASSEMBLY

TECHNICAL FIELD

The present invention relates to a valve assembly, and more particularly, to a valve assembly with modular valves.

BACKGROUND OF THE INVENTION

Fluid valves, including pneumatic and hydraulic valves, are used in a variety of situations. In some circumstances, multiple valves are employed in a relatively close proximity. Although each valve could be connected to an individual pressurized fluid conduit, it is sometimes necessary to connect multiple valves to a single fluid conduit. For convenience and efficiency, multiple fluid valves are sometimes connected together as valve assemblies/islands, such as the valve island 100 shown in FIG. 1. The valve island 100 includes a plurality of fluid valves 101, which are connected to a manifold block 102. Typically, the fluid valves 101 are manufactured independently from the manifold block 102 and are generally not designed with the manifold block 102 in mind. Therefore, the fluid valves 101 are usually designed as individual valves and the manifold block 102 is designed to accommodate the valves originally utilized. Therefore, the manifold block 102 can typically only align valves according to a single configuration.

Figure 1:
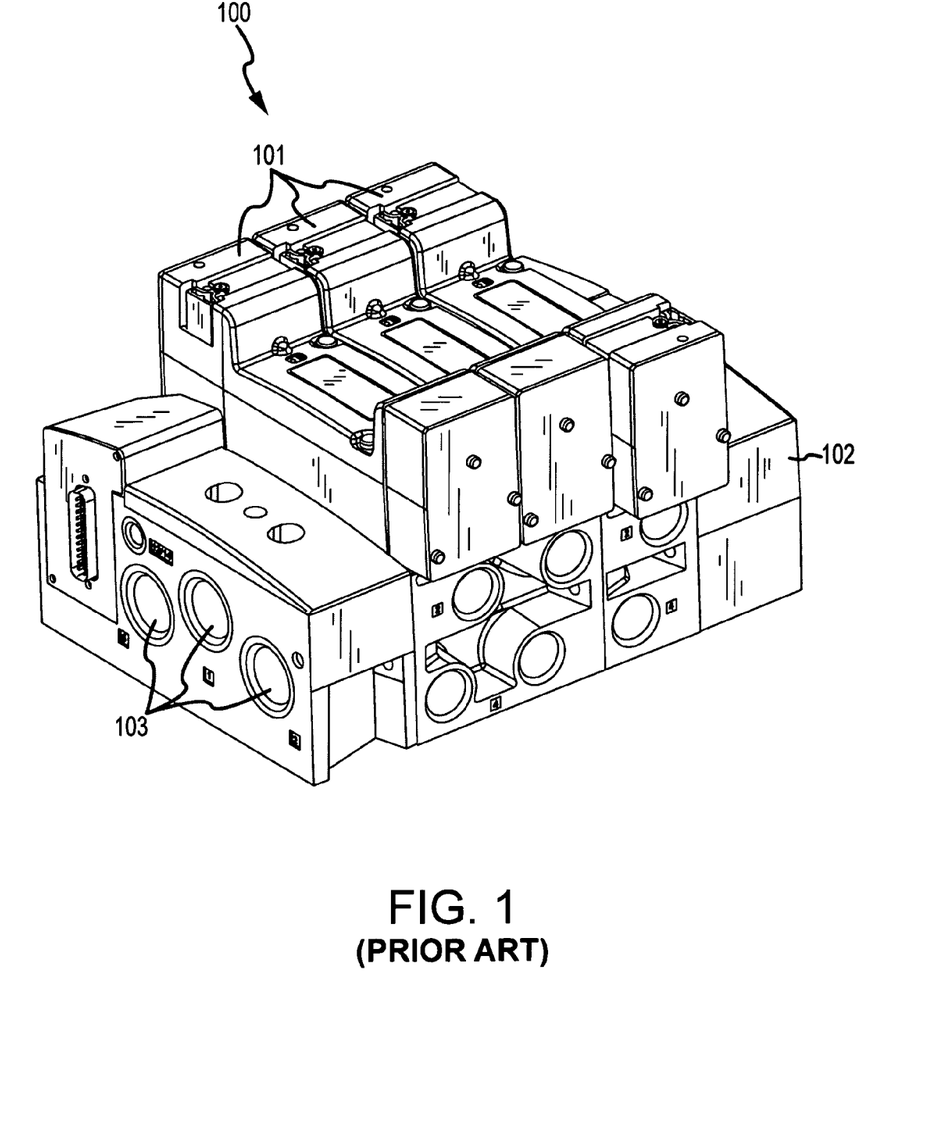
FIG. 1 shows a prior art valve island.

The manifold block 102 comprises fluid ports 103 that communicate fluid to the valves 101. Therefore, the manifold block 102 allows multiple valves 101 to operate using a single pressurized fluid conduit (not shown). Although the valve island 100 can increase the efficiency of a system by providing a single fluid conduit, as shown, the valves 101 are aligned in a substantially straight configuration due to the rigid design as described above. One reason for the limited configuration is that although shown as comprising similar valve designs, the various valves 101 may be designed with different interfaces, which prevents alternative configurations once designed. The manifold block 102 does not allow the valves 101 to be arranged in multiple configurations as may be required if different valves are desired or the valve island is coupled to a different set of components.

Although the arrangement described above may be adequate in certain situations, it may be desired or even necessary to arrange the plurality of valves 101 in alternative configurations. The prior art valve island 100 does not permit such an arrangement. Rather, prior art valve islands, such as the prior art valve island 100 are generally limited to substantially linear configurations. Restricting the valve island 100 to a linear configuration may require the remainder of the system to be modified to accommodate the valve island 100. Such a modification can often be expensive and impractical because the system components utilizing the valve island 100 are typically pre-arranged. Therefore, where the system cannot be modified to accept a linear valve island, the valve island 100 may have to be substituted with multiple valves having individual fluid conduits. Such an arrangement is inefficient and requires excessive pressurized fluid and pressurized fluid lines.

The present invention solves this and other problems and an advance in the art is achieved. The present invention provides a modular valve assembly capable of arranging a plurality of modular valves in multiple configurations. Therefore, the present invention can be modified to adapt to the remainder of the system rather than requiring the components that connect to the valve assembly to be reconfigured. Furthermore, by utilizing modular valves, the valves can be rearranged without requiring a new manifold block as required by the prior art.

Aspects

According to an aspect of the invention, a modular valve assembly comprises:
  a first valve assembly plate;
  a second valve assembly plate; and
  one or more modular valves positioned between the first valve assembly plate and the second valve assembly plate;
  wherein the first valve assembly plate and the second valve assembly plate are adapted to align the one or modular valves in one or more configurations.

Preferably, the modular valve assembly further comprises a plurality of valve retainers adapted to retain first and second portions of the modular valves.

Preferably, the one or more modular valves comprise valve actuators extending through the first valve assembly plate and adapted to actuate the one or more modular valves.

Preferably, the modular valve assembly further comprises one or more actuator plates coupled to the first valve assembly plate and adapted to communicate with the valve actuators.

Preferably, the one or more modular valves comprise a first modular valve configuration and at least a second modular valve configuration.

Preferably, the modular valve assembly further comprises a fluid distribution system formed in the second valve assembly plate and adapted to communicate fluid to the one or more modular valves.

Preferably, the one or more modular valves further comprise retaining members adapted to engage a portion of the first or second valve assembly plates to retain the modular valves.

Preferably, the modular valve assembly further comprises a retaining arm formed in the first valve assembly plate adapted to engage a retaining aperture formed in the second valve assembly plate.

According to another aspect of the invention, a modular valve assembly comprises:
  one or more modular valves; and
  a first valve assembly plate adapted to receive the one or more modular valves and align the one or more modular valves in one or more configurations.

Preferably, the modular valve assembly further comprises at least a second valve assembly plate, wherein the one or more modular valves are positioned between the first valve assembly plate and the second valve assembly plate.

Preferably, the modular valve assembly further comprises a retaining arm formed in the first valve assembly plate adapted to engage a retaining aperture formed in the second valve assembly plate.

Preferably, the first valve assembly plate comprises a plurality of valve retainers adapted to receive first and second portions of the modular valves.

Preferably, the one or more modular valves comprise valve actuators extending through the first valve assembly plate and adapted to actuate the one or more modular valves.

Preferably, the modular valve assembly further comprises one or more actuator plates coupled to the first valve assembly plate and adapted to communicate with the valve actuators.

Preferably, the one or more modular valves comprise a first modular valve configuration and at least a second modular valve configuration.

Preferably, the modular valve assembly further comprises a fluid distribution system formed in the second valve assembly plate and adapted to communicate fluid to the one or more modular valves.

Preferably, the one or more modular valves further comprise one or more retaining members adapted to engage a portion of the first valve assembly plate to retain the modular valves.

DETAILED DESCRIPTION OF THE INVENTION

FIGS. 2-7 and the following description depict specific examples to teach those skilled in the art how to make and use the best mode of the invention. For the purpose of teaching inventive principles, some conventional aspects have been simplified or omitted. Those skilled in the art will appreciate variations from these examples that fall within the scope of the invention. Those skilled in the art will appreciate that the features described below can be combined in various ways to form multiple variations of the invention. As a result, the invention is not limited to the specific examples described below, but only by the claims and their equivalents.

Figure 2:
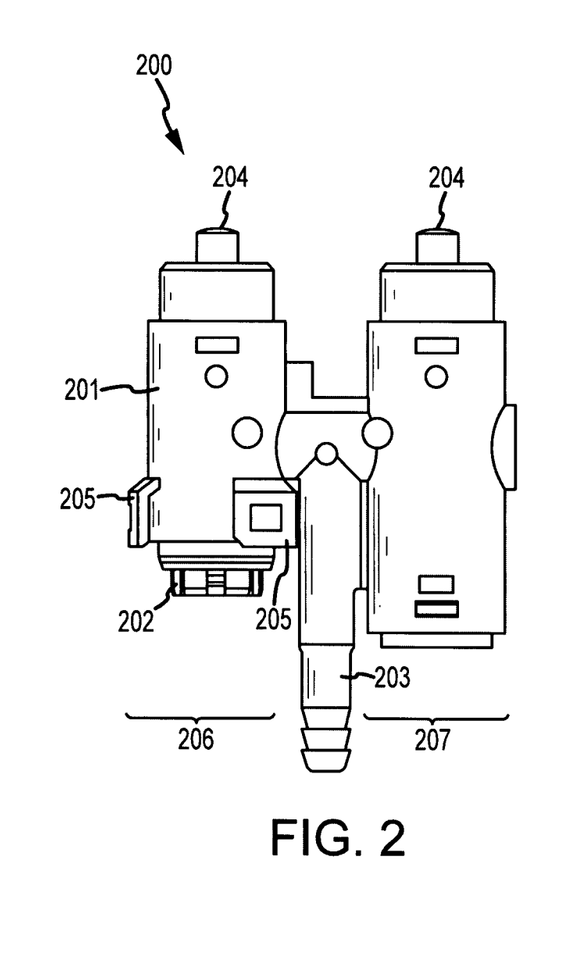
FIG. 2 shows a modular valve according to an embodiment of the invention.

FIG. 2 shows a first modular valve 200 according to an embodiment of the invention. It should be understood that by "modular" it is meant the valves are self-contained and can be easily interchanged with one another. Furthermore, each modular valve 200 comprises a uniform and well-defined housing that allows the modular valve 200 to be assembled to a valve assembly 500 as described below. Because the modular valves 200 can be self-contained, no additional components are needed to form a functional valve. Thus, once the modular valve 200 is manufactured, it can easily be assembled and disassembled in a valve assembly 500 as described below. This assists in aligning the valves in multiple configurations.

The first modular valve 200 is configured according to an embodiment of the invention. The valve 200 includes a valve housing 201, a first fluid port 202, a second fluid port 203, and valve actuators 204. According to an embodiment of the invention, the valve housing 201 is formed to create a modular interface, which can be received in a valve assembly 500. Thus, the modular interface of the valve housing 201 allows the modular valves 200 to be interchanged or rearranged. The valve actuators 204 can be provided to actuate the valve 200 from a first position to at least a second position. According to an embodiment of the invention, the first modular valve 200 also includes a retaining member 205. The retaining member 205 can be provided to assist in coupling the first modular valve 200 to a valve assembly plate (as described in more detail below).

Figure 3:
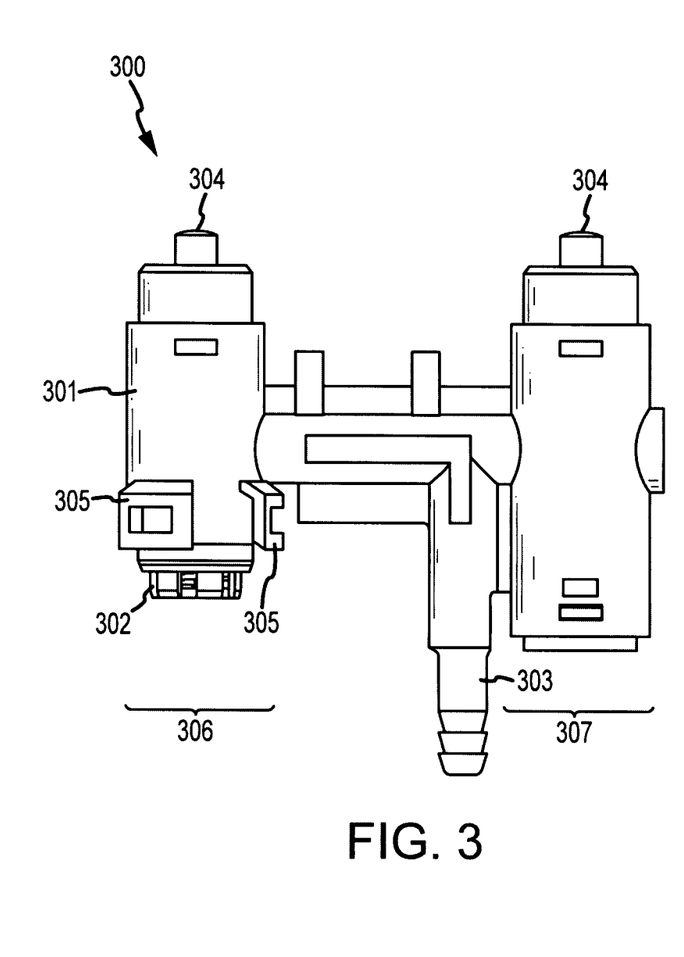
FIG. 3 shows a modular valve according to another embodiment of the invention.

FIG. 3 shows a second modular valve 300 according to another embodiment of the invention. The second modular valve 300 includes a valve housing 301, a first fluid port 302, a second fluid port 303, and valve actuators 304. The second modular valve 300 is similar to the first modular valve 200. However, the second modular valve 300 comprises a valve housing 301, which is designed according to a second embodiment of the invention. As can be seen in FIGS. 2 & 3, one difference between the first modular valve 200 and the second modular valve 300 is the spacing between the first and second portions of the valves. For example, in the embodiments shown, the first portion 206 and the second portion 207 of the valve 200 is formed substantially closer together than the first portion 306 and the second portion 307 of the valve 300. The spacing between the two portions can be designed to accommodate various valve assembly configurations when the valves are combined with one or more other valves. Therefore, the spacing between the first and second portion can be changed to accommodate various valve arrangements. Despite the difference in spacing between the first portion 206, 306 and second portion 207, 307 of the modular valves 200, 300, the first portion 206, 306 and the second portion 207, 307 are substantially the same between the modular valve 200 and the modular valve 300. Thus, a second modular valve 300 may be interchanged with a first modular valve 200 without requiring a change in the interface of the valve assembly 500 as discussed below. Although the first and second modular valves 200, 300 are shown as comprising different sizes, other differences may exist between the two modular valves 200, 300 including their function, fluid capacity, pressure rating, etc. Therefore, the present invention should not be limited to modular valves of different sizes as shown in FIGS. 2 & 3. It should be understood, however, that the remaining features of the valve housings 201, 301 create a modular valve that includes substantially similar components and features.

Figure 4:
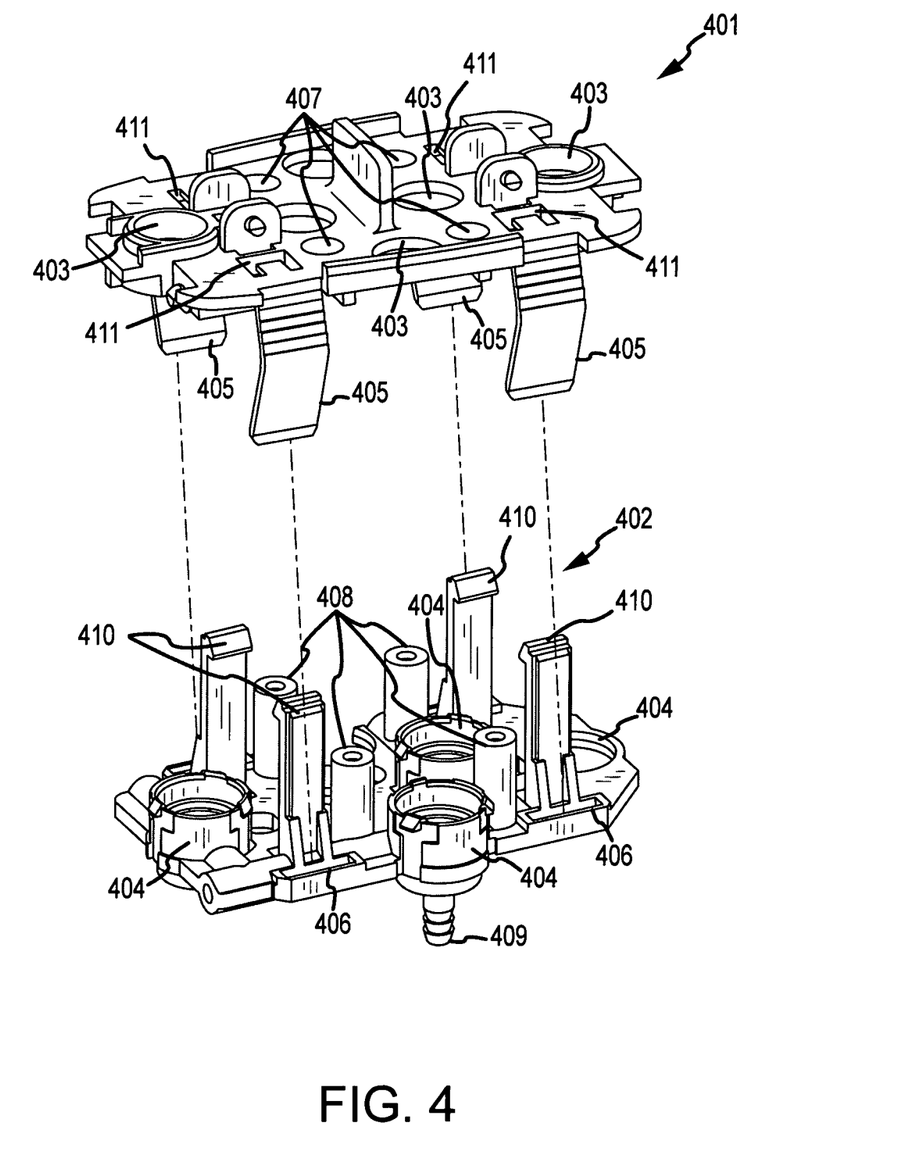
FIG. 4 shows first and second valve assembly plates according to an embodiment of the invention.

FIG. 4 shows a first valve assembly plate 401 and a second valve assembly plate 402. The first and second valve assembly plates 401, 402 are adapted to accept a plurality of modular valves 200, 300. When combined with one or more modular valves 200, 300, the first and second valve assembly plates 401, 402 form a valve assembly 500 (See FIG. 5). According to an embodiment of the invention, the first and second valve assembly plates 401, 402 are adapted to retain one or more modular valves 200, 300. According to an embodiment of the invention, the first valve assembly plate 401 comprises a plurality of valve retainers 403. The valve retainers 403 can be arranged according to a desired configuration and are adapted to accept the first 206, 306 and second 207, 307 portions of the modular valves 200, 300. According to an embodiment of the invention, the valve retainers 403 are configured such that they may position the modular valves 200, 300 according to more than one alignment configuration. For example, the valve retainers 403 may be sized and located such that the modular valves 200, 300 are capable of being received by more than one combination of valve retainers 403. The particular position of the modular valves 200, 300 can therefore depend on the particular combination of valve retainers 403 used.

According to an embodiment of the invention, the second valve assembly plate 402 also comprises a plurality of valve retainers 404. Although the valve retainers 403, 404 are shown as substantially circular, it should be understood that the valve retainers 403, 404 may comprise non-circular shapes. According to an embodiment of the invention, the valve retainers 403, 404 can comprise a shape substantially similar to the shape of the first 206, 306 and second 207, 307 portions of the modular valves 200, 300. This provides a better fitting when the first 206, 306 and second 207, 307 portions of the modular valves 200, 300 are received by the valve retainers 403, 404.

According to an embodiment of the invention, the valve retainers 403 of the first valve assembly plate 401 can substantially align with the valve retainers 404 of the second valve assembly plate 402. Therefore, when the first and second valve assembly plates 401, 402 engage one another, the modular valves 200, 300 can be held in place. Although the valve retainers 403, 404 are shown as substantially aligning when the first valve assembly plate 401 engages the second valve assembly plate 402, the valve retainers 403, 404 do not have to be substantially aligned. For example, according to one embodiment of the invention, the valve retainers 403 of the first valve assembly plate 401 may be provided to retain valves 200, 300 in a first arrangement, while the valve retainers 404 of the second valve assembly 402 are provided to retain the valves 200, 300 in a second arrangement, which is different from the first arrangement. Therefore, the particular valve retainers 403, 404 used can be chosen to vary the valve arrangement.

According to an embodiment of the invention, the first valve assembly plate 401 comprises one or more retaining arms 405. The retaining arms 405 are adapted to engage corresponding retaining apertures 406 formed in the second valve assembly plate 402. According to an embodiment of the invention, the retaining arms 405 are adapted to engage the retaining apertures 406 in a snap-fit arrangement as is generally known in the art. Therefore, the first and second valve assembly plates 401, 402 can easily engage and disengage one another. This allows for an efficient movement of valves 200, 300 into different arrangements to accommodate a variety of configurations. In addition, the second valve assembly plate 402 may include one or more retaining arms 410. The retaining arms 410 may be provided in addition or in place of the retaining arms 405 in order to aid in the engagement and retention of the first and second valve assembly plates 401, 402. According to an embodiment of the invention, the retaining arms 410 provided on the second valve assembly plate 402 may engage corresponding retaining apertures 411 formed in the first valve assembly plate 401. One skilled in the art can appreciate that the retaining arms 410 can engage the retaining apertures 411 in a snap-fit arrangement as described above in relation to the retaining arms 405 and corresponding retaining apertures 406.

According to another embodiment of the invention, the first and second valve assembly plates 401, 402 may be held together using fasteners (not shown). The fasteners may pass through fastener apertures 407 formed in the first valve assembly plate 401 and engage fastener threads 408 formed in the second valve assembly plate 402. The fasteners may comprise any manner of bolt or screw arrangement, for example. According to some embodiments, the threads 408 may be omitted, for example if the fasteners comprise self-tapping screws for example. Therefore, the invention should not be limited to embodiments requiring fastener apertures 407 and threads 408. The particular fasteners used are not important for the purposes of the present invention and therefore, should not limit the scope of the present invention.

According to an embodiment of the invention, a fluid coupling 409 is provided. Although the fluid coupling 409 is shown as being formed in the second valve assembly plate 402, it should be understood that in other embodiments, the fluid coupling 409 can be formed in the first valve assembly plate 401. The fluid coupling 409 can be provided to couple the second valve assembly plate 402 to a pressurized fluid source (not shown). The pressurized fluid source may comprise pneumatic or hydraulic fluid, for example. The fluid coupling 409 may be adapted to distribute pressurized fluid to valves 200, 300. The fluid coupling 409 may be formed in the valve retainers 403 or 404 to communicate fluid with one or both of the fluid ports of the valves 200, 300. Although only a single fluid coupling 409 is shown in FIG. 4, it should be understood that in other embodiments, a fluid coupling 409 may be provided with each of the valve retainers 404. This allows a greater flexibility with regard to the modular valve's position with respect to the valve assembly plate 402 because each valve retainer 404 could accept the first portion 206, 306 of the modular valves 200, 300 and provide fluid communication to the fluid ports 202, 302. Therefore, regardless of the combination of valve retainers 404 utilized, fluid can communicate with the first fluid port 202, 302. The second fluid port 203, 303 can communicate with an external component (not shown) when the modular valve 200, 300 is actuated.

Figure 5:
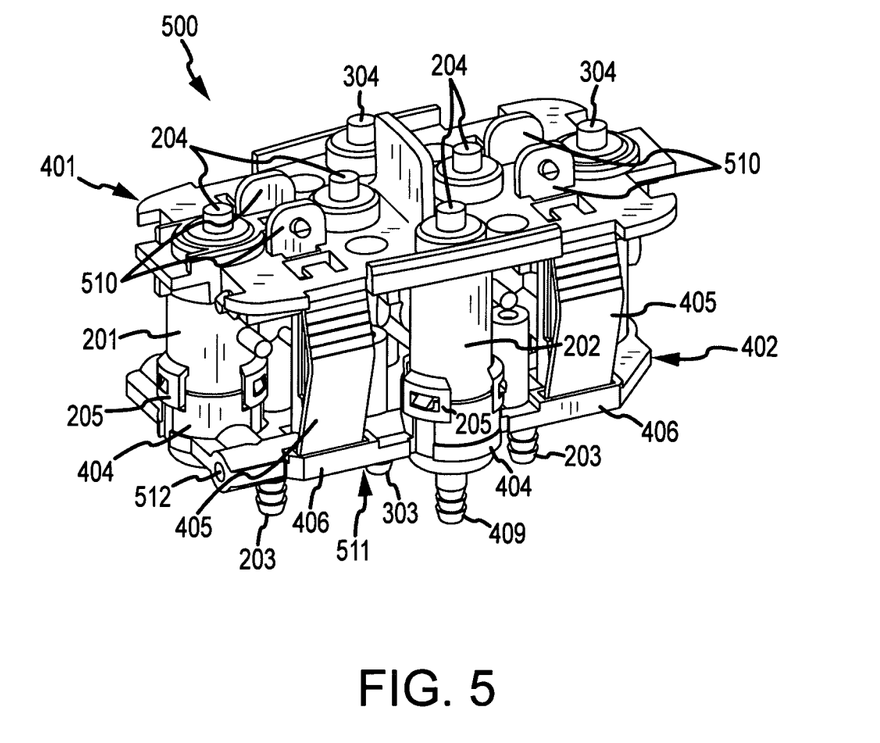
FIG. 5 shows a modular valve assembly according to an embodiment of the invention.

FIG. 5 shows a valve assembly 500 according to an embodiment of the invention. The valve assembly 500 shown in FIG. 5 comprises the first and second valve assembly plates 401, 402 along with two first modular valves 200 and one second modular valve 300. It should be understood that the particular combination of first and second modular valves 200, 300 is not limited to the particular combination shown, but rather the combination may be varied depending on the desired configuration. Furthermore, it should be understood that the particular alignment of the modular valves 200, 300 is not limited to the configuration shown in FIG. 5. As shown, the valves 200, 300 of the valve assembly 500 are not limited to being arranged in an approximately linear configuration. Rather, the valve assembly 500 can arrange the modular valves 200, 300 in one or more configurations. Therefore, the valve assembly 500 provides a more flexible arrangement than available in the prior art. Furthermore, the valve assembly plates 401, 402 and modular valves 200, 300 can be manufactured to accommodate more than one configuration. Therefore, the valve assembly 500 is not limited to a single valve arrangement as in the prior art. Rather, the valves provided in the valve assembly 500 may be arranged in multiple configurations by utilizing different combinations of the valve retainers 403, 404.

As shown, the valves 200, 300 are retained within the valve assembly 500 by the valve retainers 403 formed in the first valve assembly plate 401 as well as the valve retainers 404 formed in the second valve assembly plate 402. In addition to the valve retainers 403, 404, the valves 200, 300 are also retained in position using the retaining members 205, which can be adapted to engage the valve retainers 404 in a snap-fit arrangement as is generally understood in the art. Therefore, even in embodiments where the valve retainers 403 of the first valve assembly plate 401 are not utilized, the chances of the valves 200, 300 accidentally shifting out of position are substantially reduced. In addition, the retaining members 205 can be utilized to retain the valves 200, 300 in the valve retainers 404 during periods when the first valve assembly plate 401 is removed. This may occur, for example, if other valves are being replaced or added. The desired valves can then be retained in position. It should also be understood that in some embodiments, only one valve assembly plate 401 or 402 is used in operation and the modular valve 200, 300 can be held in position using the retaining members 205.

As can be seen in FIG. 5, the valve actuators 204, 304 extend beyond the first valve assembly plate 401 to allow the valve 200, 300 to be actuated. According to an embodiment of the invention, the valve retainers 403 are formed such that the valve actuators 204, 304 can extend beyond the first valve assembly plate 401 when the first valve assembly plate 401 engages the second valve assembly plate 402. According to an embodiment of the invention, an actuator plate (See FIG. 6) can be provided to actuate the valves 200, 300. According to an embodiment of the invention, the actuator plate can be fastened to tabs 510 formed in the first valve assembly plate 401. The actuator plate can be provided in embodiments where the valves 200, 300 comprise mechanically actuated valves. In other embodiments, the actuator plate can be omitted, such as when the valves are pilot or electrically actuated.

According to an embodiment, the valve assembly 500 can be provided with a fluid distribution system 511. The fluid distribution system 511 can be configured to receive a pressurized fluid from the fluid coupling 409 formed in the second valve assembly plate 402 and distribute the pressurized fluid to the valves 200, 300 included in the valve assembly 500 using fluid conduits 512. The fluid conduits 512 can be coupled to one or both of the fluid ports 202, 203 formed in the modular valves 200, 300. The fluid distribution system 511 can be provided to supply all of the valves 200, 300 in the valve assembly 500 with fluid from a single source connected to port 409. The fluid distribution system 511 simplifies the connections required for the valve assembly 500. Furthermore, the fluid distribution system 511 reduces the number of required fluid lines as well as the amount of pressurized fluid.

Figure 6:
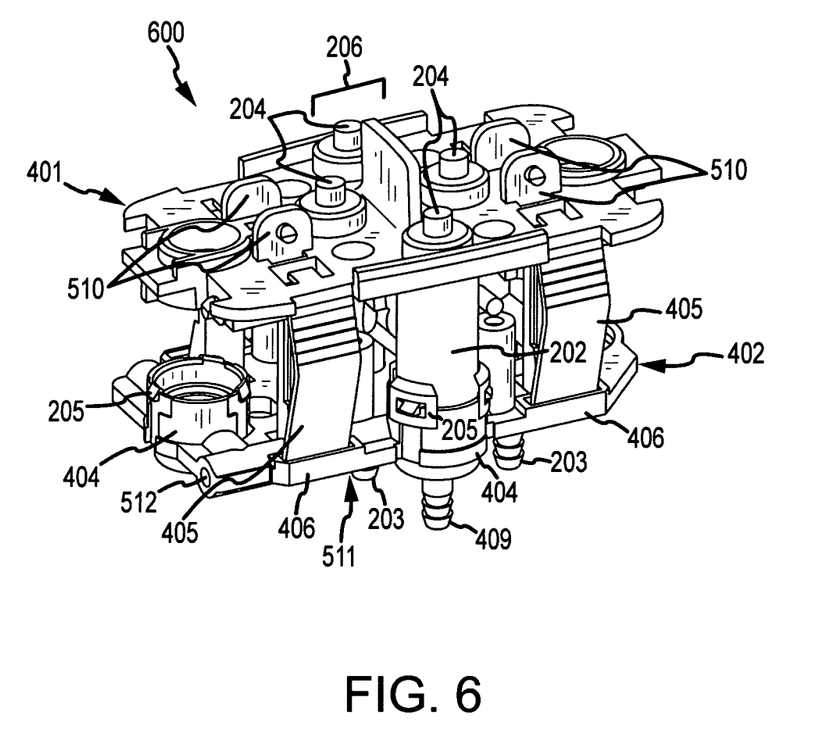
FIG. 6 shows a modular valve assembly according to another embodiment of the invention.

FIG. 6 shows a valve assembly 600 according to another embodiment of the invention. The valve assembly 600 comprises first and second valve assembly plates 401, 402 that are substantially the same as the valve assembly plates 401, 402 of the valve assembly 500. The difference between the valve assembly 500 and the valve assembly 600 is the position and number of the modular valves 200, 300. Specifically, the modular valve 300 of the valve assembly 500 has been removed. Additionally, the first modular valve 200 positioned on the left of the valve assembly 600 as shown in FIG. 6 has been rotated. Specifically, the first portion 206 of the modular valve 200 is now retained by the valve retainer 403 that held the first portion 306 of the modular valve 300 in the valve assembly 500. In addition, it should be noted that there are two valve retainers 403 and 404 in the first and second valve assembly plates 401, 402 that are unoccupied in the valve assembly 600.

The valve assembly 600 provides one embodiment of the invention to illustrate that a single set of valve assembly plates 401, 402 may be used to create multiple valve configurations simply by rearranging the position of the valves 200, 300 with respect to the valve assembly plates 401, 402. Furthermore, the valve assembly 600 illustrates that because the valves 200, 300 comprise modular valves, the same valve retainers 403, 404 may be utilized regardless of the particular modular valve employed. Therefore, the modular valves 200, 300 may be interchanged without having to manufacture a different set of valve assembly plates 401, 402.

Figure 7:
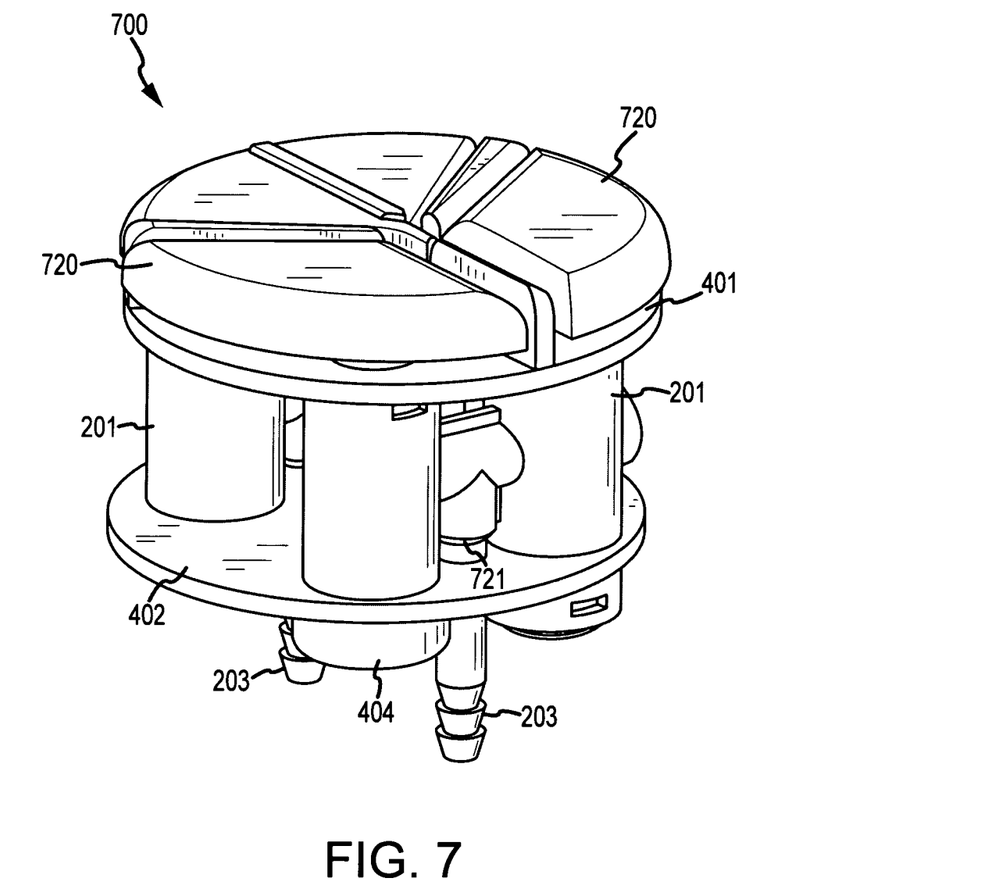
FIG. 7 shows a modular valve assembly according to another embodiment of the invention.

FIG. 7 shows a valve assembly 700 according to another embodiment of the invention. The valve assembly 700 is similar to the valve arrangement 500, however, the valve assembly 700 comprises two first modular valves 200 and omits the second modular valve 300 present in the valve assembly 500. As shown, the first valve assembly plate 401 and the second valve assembly plate 402 comprise circular shapes. In addition, the valve retainer 404 formed in the second valve assembly plate 402 extends from the side of the second valve assembly plate 402 facing away from the first valve assembly plate 401. Therefore, the valve 200 can rest within the valve retainer 404 with the first valve assembly plate 401 being closer to the second valve assembly plate 402 when the first 401 and second 402 valve assembly plates engage one another. In addition, the second valve assembly plate 402 comprises an aperture 721 adapted to accept the second port 203 of the modular valve 200. According to an embodiment of the invention, because the valve assembly 700 accepts modular valves 200, the position of the valves 200 may be rotated as desired. Such a capability is not possible in prior art valve assemblies, which are not formed using modular valves 200.

Another difference in the valve assembly 700 is that the retaining arm 405 is not present on the first valve assembly plate 401. According to an embodiment of the invention, the valves 200 can be used to couple the first valve assembly plate 401 to the second valve assembly plate 402. The valves 200 may include additional fastener members 205 that are adapted to engage the first valve assembly plate 401. Therefore, fastener members 205 may be used to hold the first 401 and second 402 valve assembly plates in place.

According to an embodiment of the invention, the valve assembly 700 also includes actuator plates 720. The actuator plates 720 can be provided to actuate the valves 200. The actuator plate 720 can be moved in a first direction to actuate the valve 200 to a first position and moved in a second direction to actuate the valve 200 to a second position. The actuator plate 720 can be provided to prevent accidental actuation of the valve 200 from a first position to a second position by substantially covering the non-actuated valve actuator 204. According to an embodiment of the invention, this can be accomplished by pivoting the actuator plate 720. Therefore, when the actuator plate 720 is actuated to a first position, the portion of the actuator plate 720 covering the un-actuated valve actuator 204 is raised away from the un-actuated valve actuator 204.

The modular valve assemblies discussed above provide a flexible alternative to the prior art valve islands that are restricted to a single, and often linear, configuration. The modular valve assemblies of the present invention are adapted to arrange modular valves 200, 300 to accommodate the various components connected to the valves 200, 300. The valves 200, 300 comprise modular valves. In other words, the valves are self-contained and can be interchanged with one another and combined in various combinations to accommodate multiple configurations. The modular valves 200, 300 comprise a uniform housing 201, 301 that allows the valves to be interchanged with one another and positioned in a variety of alignments. Therefore, a single valve assembly plate 401, 402 may be used with various combinations of valves 200, 300 to form a plurality of modular valve assemblies having different shapes. In addition, the valve assembly plates 401, 402 may be adapted to accept more than one modular valve 200, 300 thereby allowing for a wider variety of designs.

The detailed descriptions of the above embodiments are not exhaustive descriptions of all embodiments contemplated by the inventors to be within the scope of the invention. Indeed, persons skilled in the art will recognize that certain elements of the above-described embodiments may variously be combined or eliminated to create further embodiments, and such further embodiments fall within the scope and teachings of the invention. It will also be apparent to those of ordinary skill in the art that the above-described embodiments may be combined in whole or in part to create additional embodiments within the scope and teachings of the invention.

Thus, although specific embodiments of, and examples for, the invention are described herein for illustrative purposes, various equivalent modifications are possible within the scope of the invention, as those skilled in the relevant art will recognize. The teachings provided herein can be applied to other valve assemblies, and not just to the embodiments described above and shown in the accompanying figures. Accordingly, the scope of the invention should be determined from the following claims.

We claim:

1. A modular valve assembly (500), comprising:
   a first valve assembly plate (401);
   a second valve assembly plate (402) having at least a first, second, and third valve retainers; and
   one or more modular valves (200, 300) positioned between the first valve assembly plate (401) and the second valve assembly plate (402), wherein the one or more modular valves (200, 300) may be positioned between the first valve assembly plate (401) and the second valve assembly plate (402) to comprise a first modular valve assembly configuration and may be positioned between the first valve assembly plate (401) and the second valve assembly plate (402) to comprise at least a second, different, modular valve assembly configuration, and wherein the one or more modular valves (200, 300) further comprise retaining members (205, 305) adapted to engage a portion of the second valve assembly plate (402) to retain the modular valves (200, 300);
   wherein the first valve assembly plate (401) and the second valve assembly plate (402) are adapted to align one of the one or more modular valves (200, 300) in the first modular valve assembly configuration and second modular valve assembly configuration, wherein a first of the one or more modular valves occupies only two of the first, second, and third valve retainers while in the first modular valve assembly configuration, and wherein the first of the one or more modular valves occupies only two of the first, second, and third valve retainers in the second modular valve assembly configuration, wherein the second modular valve assembly configuration comprises a different combination of valve retainers occupied by the first modular valve from the combination of valve retainers occupied by the first modular valve when in the first modular valve assembly configuration.

2. The modular valve assembly (500) of claim 1, further comprising a plurality of valve retainers (403, 404) adapted to retain first and second portions (206, 207) of the modular valves (200, 300).

3. The modular valve assembly (500) of claim 1, wherein the one or more modular valves (200, 300) comprise valve actuators (204, 304) extending through the first valve assembly plate (401) and adapted to actuate the one or more modular valves (200, 300).

4. The modular valve assembly (500) of claim 3, further comprising one or more actuator plates (720) coupled to the first valve assembly plate (401) and adapted to communicate with the valve actuators (204, 304).

5. The modular valve assembly (500) of claim 1, further comprising a fluid distribution system (511) formed in the second valve assembly plate (402) and adapted to communicate fluid to the one or more modular valves (200, 300).

6. The modular valve assembly (500) of claim 1, further comprising a retaining arm (405) formed in the first valve assembly plate (401) adapted to engage a retaining aperture (406) formed in the second valve assembly plate (402).

7. A modular valve assembly (500), comprising:
   one or more modular valves (200, 300) positionable in a first modular valve assembly configuration and at least a second modular valve assembly configuration; and
   a first valve assembly plate (401) having at least a first, second, and third valve retainers, each being adapted to receive the one or more modular valves (200, 300) and to align the one or more modular valves (200, 300) in the first modular valve assembly configuration and the second modular valve configuration, wherein the first, second, and third valve retainers (403) are adapted to receive first and second portions (206, 207) of the one or more modular valves (200, 300), and wherein a first of the one or more modular valves occupies only two of the first, second, and third valve retainers while in the first modular valve assembly configuration, and wherein the first of the one or more modular valves occupies only two of the first, second, and third valve retainers in the second modular valve assembly configuration, wherein the second modular valve assembly configuration comprises a different combination of valve retainers occupied by the first modular valve from the combination of valve retainers occupied by the first modular valve when in the first modular valve assembly configuration.

8. The modular valve assembly (500) of claim 7, further comprising at least a second valve assembly plate (402), wherein the one or more modular valves (200, 300) are positioned between the first valve assembly plate (401) and the second valve assembly plate (402).

9. The modular valve assembly (500) of claim 8, further comprising a retaining arm (405) formed in the first valve assembly plate (401) adapted to engage a retaining aperture (406) formed in the second valve assembly plate (402).

10. The modular valve assembly (500) of claim 8, wherein the one or more modular valves (200, 300) further comprise one or more retaining members (205) adapted to engage a portion of the second valve assembly plate (402) to retain the modular valves (200, 300).

11. The modular valve assembly (500) of claim 7, wherein the one or more modular valves (200, 300) comprise valve actuators (204, 304) extending through the first valve assembly plate (401) and adapted to actuate the one or more modular valves (200, 300).

12. The modular valve assembly (500) of claim 11, further comprising one or more actuator plates (720) coupled to the first valve assembly plate (401) and adapted to communicate with the valve actuators (204, 304).

13. The modular valve assembly (500) of claim 7, further comprising a fluid distribution system (511) formed in the second valve assembly plate (402) and adapted to communicate fluid to the one or more modular valves (200, 300).

14. A modular valve assembly (500), comprising:
   a first valve assembly plate (401);
   a second valve assembly plate (402) having at least a first, second, and third valve retainers;
   one or more modular valves (200, 300) positionable between the first valve assembly plate (401) and the second valve assembly plate (402), wherein the one or more modular valves (200, 300) may be positioned in a first modular valve assembly configuration and at least a second, different, modular valve assembly configuration, and wherein the one or more modular valves (200, 300) further comprise retaining members (205, 305) adapted to engage a portion of the second valve assembly plate (402) to retain the modular valves (200, 300);
   wherein the first valve assembly plate (401) and the second valve assembly plate (402) are adapted to align one of the one or more modular valves (200, 300) in the first modular valve assembly configuration and second modular valve assembly configuration, wherein one of the one or more modular valves occupies two of the first, second, and third valve retainers while in the first modular valve assembly configuration, and wherein one of the one or more modular valves occupies two of the first, second, and third valve retainers in the second modular valve assembly configuration, wherein the second modular valve assembly configuration is different from the first modular valve assembly configuration; and a retaining arm (405) formed in the first valve assembly plate (401) adapted to engage a retaining aperture (406) formed in the second valve assembly plate (402).

\* \* \* \* \*